(No Model.)
E. CLIFF.
VEHICLE SPRING.
No. 379,366. Patented Mar. 13, 1888.
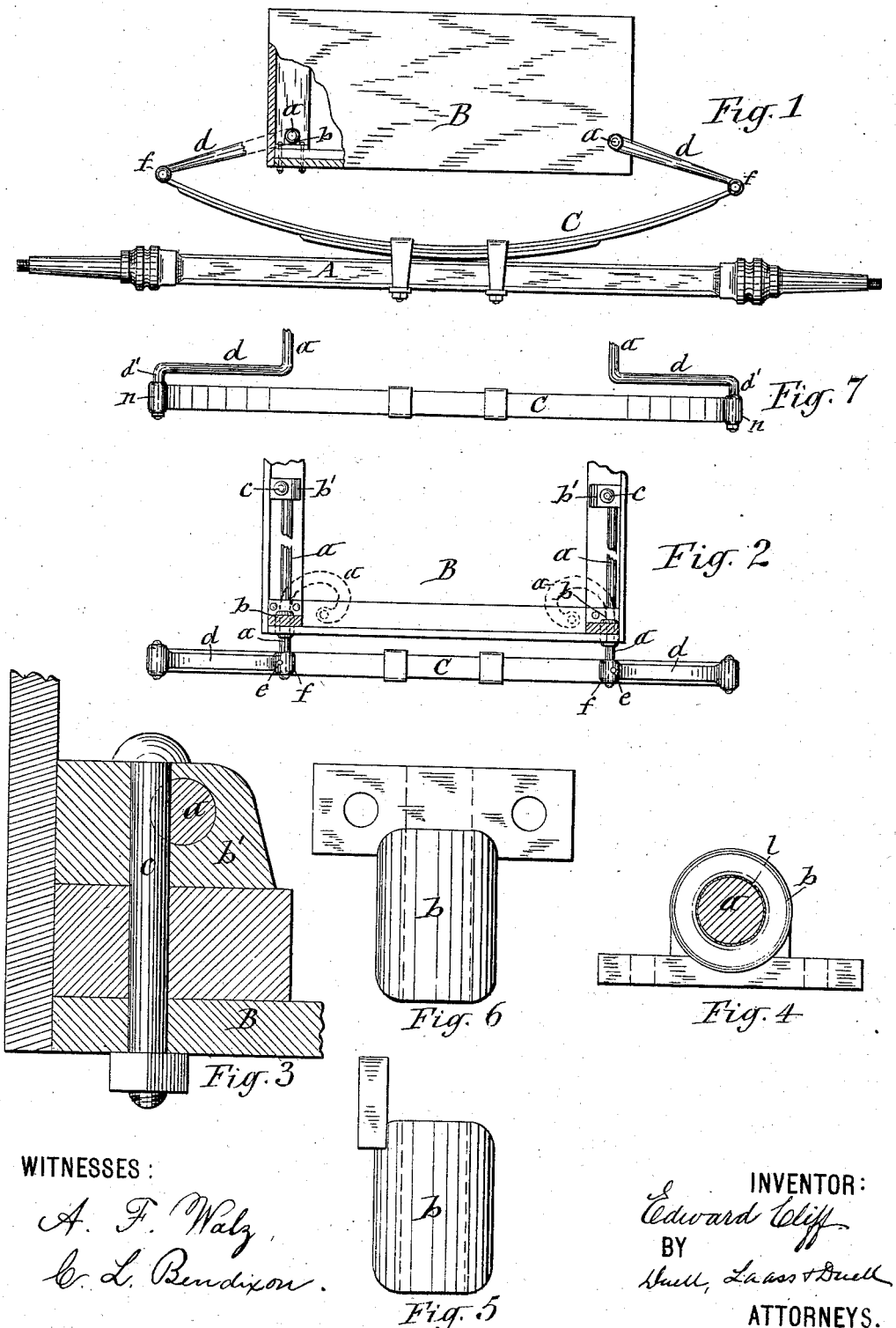
WITNESSES:
A. F. Walz
C. L. Bendixon
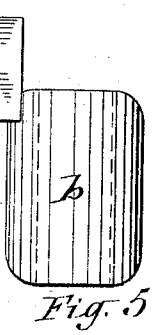
INVENTOR:
Edward Cliff
BY
Duell, Laass & Duell
ATTORNEYS.

UNITED STATES PATENT OFFICE.

EDWARD CLIFF, OF ROCHESTER, NEW YORK.

VEHICLE-SPRING.

SPECIFICATION forming part of Letters Patent No. 379,366, dated March 13, 1888.

Application filed October 27, 1887. Serial No. 253,517. (No model.)

*To all whom it may concern:*

Be it known that I, EDWARD CLIFF, of Rochester, in the county of Monroe, in the State of New York, have invented new and useful Improvements in Vehicle-Springs, of which the following, taken in connection with the accompanying drawings, is a full, clear, and exact description.

This invention relates to the class of spring-vehicles in which cross springs are mounted on the forward head-block and hind axle or bolster, and the body is hung on the ends of said cross-springs.

My invention consists in improved means for hanging the body on the cross-spring, whereby I obtain a spring-vehicle which is simple, neat, and compact, and possesses an elasticity which renders the vehicle very comfortable to the person riding therein.

The invention is fully illustrated in the annexed drawings, in which—

Figure 1 is a rear end view of a vehicle-body and its spring-support on the axle embodying my improvements. Fig. 2 is a top plan view of the same. Fig. 3 is an enlarged transverse section of the torsion spring-bar taken at its rigid fastening to the body. Fig. 4 is a transverse section of said spring-bar, taken at the outer end of the box by which it is journaled on the body. Figs. 5 and 6 are respectively side and top plan views of said box, and Fig. 7 is a top plan view of a modification of the form of the crank-arms by which the torsion-springs are connected to the cross-spring.

Similar letters of reference indicate corresponding parts.

A denotes the hind axle of a vehicle, B the body of the same, and C the cross-spring mounted rigidly on the axle and supporting the body. Said cross-spring is of the ordinary so-called "semi-elliptic-form," terminating with uniformly outward-extending ends, and formed with shackle-eyes on said ends. Upon the said spring I support the body by means of crank-arms $d$ $d$, secured to the body and projecting laterally in opposite directions therefrom, and coupled at their outer ends to the ends of the cross-spring C.

In order to increase the elasticity of the support of the body, I connect the crank-arms $d$ to torsion spring-bars $a$ $a$, secured to opposite sides of the body, and either to the under side of the bottom of the body or to the upper or inner side of the said bottom. The torsion spring-bars $a$ $a$ may be either curved, as represented by dotted lines in Fig. 2 of the drawings, or straight, as illustrated by full lines in said figure. I prefer the latter form in that they lie more closely and compactly on the body. Each of said straight torsion spring-bars I extend through boxes $b$ $b'$, which are bolted or otherwise rigidly attached to the body. The inner ends of the bars $a$ $a$, I firmly secure to the boxes $b'$ $b'$, so as to prevent them from turning therein, and this I prefer to accomplish by pins or bolts $c$ $c$, passing transversely through the boxes $b'$ $b'$, and through the sides of the spring-bars, as illustrated in Fig. 3 of the drawings. The opposite ends of the said spring-bars project from the end of the body, and are allowed to turn in the boxes $b$ $b$, which latter I provide with a lining, $l$, of leather or other suitable material, to prevent the spring-bars from rattling and squeaking.

Heretofore torsion spring-bars have been formed with cranks, by which they were fastened to the under side of the body of the vehicle; but experience has proven that such springs are liable to rattle or pound against the under side of the body. This defect I obviate by the straight spring-bars attached to the body in the manner aforesaid.

To the outer ends of the torsion spring-bars $a$ $a$, I rigidly attach the crank-arms $d$ $d$, which project laterally outward or toward opposite sides of the vehicle, and are coupled at their outer ends to the ends of the cross-spring C in any suitable and well-known manner. The crank-arms I prefer to form separate from the spring-bars, and attach them thereto, either by keys $e$ $e$, passing transversely through eyes $f$ $f$, formed on the crank-arms, and through notches in the inclosed sides of the spring-bars, or by set-screws, or any other suitable and well-known means which readily suggest themselves to a mechanic, and when so attached I prefer to extend the outer ends of spring-bars $a$ $a$ across the cross-spring C, so as to allow me to arrange the crank-arms in the same vertical plane with the cross-spring C, as illustrated in Fig. 2 of the drawings.

The aforesaid connection of the crank-arms with the torsion spring-bars allows the former to be detached when required for repairs or renewal without disturbing the torsion spring-bars. I do not, however, limit myself to the said attachment of the crank-arms to the torsion spring-bars, inasmuch as said arms may be formed integral with the spring-bars, as represented in Fig. 7 of the drawings, and in this case the torsion spring-bars $a\ a$ are to be terminated between the cross-spring and body, and the crank-arms $d\ d$ to be terminated with trunnions $d'\ d'$, which extend through the eyes $n\ n$, formed on the ends of the cross-spring.

I am aware that prior to my present invention crank-arms attached to torsion spring-bars have been coupled to cross-springs formed with open scrolls on their ends; but in practice it is found that such connections of the cross-springs with the crank-arms tend to twist the ends of the cross-springs out of shape, and this I obviate by extending the ends of the cross spring uniformly outward and coupling the crank-arms to said ends of the cross-spring.

Having described my invention, what I claim as new, and desire to secure by Letters Patent, is—

1. In combination with the body B, cross-spring C, and crank-arms $d\ d$, coupled to the ends of said spring, the boxes $b\ b\ b'\ b'$, secured to the body, the linings $l$ in the boxes $b\ b$, the straight torsion spring-bars $a\ a$, journaled in the latter boxes, and the pins $c\ c$, passing transversely through the boxes $b'\ b'$, and through the sides of the bars $a\ a$, substantially as described and shown.

2. In combination with the cross-spring C and torsion spring-bars $a\ a$, the crank-arms $d\ d$, detachably connected to the bars $a\ a$ and coupled to the ends of the cross-spring, substantially as described and shown.

In testimony whereof I have hereunto signed my name, in the presence of two witnesses, at Syracuse, in the county of Onondaga, in the State of New York, this 22d day of October, 1887.

EDWARD CLIFF. [L. S.]

Witnesses:
HOWARD P. DENISON,
C. L. BENDIXON.